United States Patent [19]
Ball

[11] Patent Number: 5,594,747
[45] Date of Patent: Jan. 14, 1997

[54] DUAL-WAVELENGTH PUMPED LOW NOISE FIBER LASER

[76] Inventor: Gary A. Ball, 19 Newbury Ct., Simsbury, Conn. 06070

[21] Appl. No.: 398,936

[22] Filed: Mar. 6, 1995

[51] Int. Cl.$^6$ .................................................. H01S 3/13
[52] U.S. Cl. ................... 372/31; 372/23; 372/68; 372/69; 372/102; 372/96; 372/27; 372/64; 372/19
[58] Field of Search .................... 372/31, 23, 19, 372/68, 69, 6, 96, 27, 102, 64

[56] References Cited

U.S. PATENT DOCUMENTS

| | | | |
|---|---|---|---|
| 4,725,110 | 2/1988 | Glenn et al. | 350/3.61 |
| 4,807,950 | 2/1989 | Glenn et al. | 350/3.61 |
| 5,103,456 | 4/1992 | Scifres et al. | 372/102 |
| 5,237,576 | 8/1993 | DiGiovanni et al. | 372/6 |
| 5,257,273 | 10/1993 | Farries et al. | 372/102 |
| 5,305,335 | 4/1994 | Ball et al. | 372/102 |
| 5,317,576 | 5/1994 | Leonberger et al. | 372/102 |

OTHER PUBLICATIONS

Applied Phys., vol. 43, No. 5, May 1972, pp. 2327–2335, H. Kogelnik and C. V. Shank, "Coupled-Wave Theory of Distributed Feedback Lasers".
Optic Letters, vol. 19, No. 24, Dec. 15, 1994, pp. 2101–2103, J. T. Kringlebotn et al., "Er$^{3+}$:Yb$^{3+}$ –codoped fiber distributed–feedback laser".
Electronics Letters, vol. 30, No. 12, 9th Jun. 1994, pp. 972–973, J. T. Kringlebotn et al., "Highly–efficient, low–noise grating–feedback Er$^{3+}$:Yb$^{3+}$ codoped fibre laser".
IEEE Photonics Technology Letters, vol. 5, No. 10, Oct. 1993, pp. 1162–1164, J. T. Kringlebotn et al., "Efficient Diode–Pumped Single–Frequency Erbium: Ytterbium Fiber Laser".
Electronics Letters, 2nd Sep. 1993, vol. 29, No. 18, pp. 1623–1625, G. A. Ball et al., "Low Noise Single Frequency Linear Fibre Laser".

Primary Examiner—Leon Scott, Jr.

[57] ABSTRACT

A dual wavelength pumped low noise fiber laser includes a fiber laser 10 comprising a pair of Bragg gratings 14,16 at opposite ends of a fiber laser cavity 18 which is co-doped with two rare-earth dopants, Er$^{+3}$Yb$^{+3}$, so as to allow lasing to occur at a lasing wavelength $\lambda_L$. A first pump signal 20 efficiently pumps the Yb to the excited state and the Yb energy is transitioned to the Er atoms which ultimately lase at the desire lasing frequency. Because Yb is pumped so efficiently, high pump absorption is achieved, thereby providing high laser output power and, consequently, reduced RIN. Simultaneously, a second pump signal 52 directly pumps the Er at a different wavelength $\lambda_{P2}$ which populates the lasing transition more quickly, thereby allowing sufficient bandwidth of a closed loop control on the second pump signal 52 to control low frequency RIN spiking due to relaxation oscillations in the laser.

10 Claims, 4 Drawing Sheets

DUAL-WAVELENGTH PUMPED LOW NOISE FIBER LASER

TECHNICAL FIELD

This invention relates to fiber lasers and more particularly to low noise fiber lasers.

BACKGROUND ART

It is known in the art of fiber lasers that a fiber laser comprises a length of optical fiber (or laser cavity) which is doped with an optically active rare-earth ion (or gain medium), e.g., Neodymium or Erbium, and has optical reflectors spaced apart by a predetermined distance along the fiber with the gain medium there between. The fiber is optically pumped by pump light having a predetermined pump wavelength which excites the gain medium such that the population of excited atoms is greater than the population of unexcited (or less excited) atoms in the lasing transition (known as population inversion). As the energy of the atoms in the gain material transition back to their original unexcited state (or a lower energy level), photons are emitted at a predetermined lasing wavelength. Such emitted photons cause (or stimulate) other excited atoms in the gain medium to emit similar photons, thereby creating the well known lasing effect. The optical reflectors are designed to reflect a predetermined amount of light at the lasing wavelength and the length of the cavity and the amount of cavity gain is set so as to cause light at the lasing wavelength to continuously oscillate within the cavity to allow lasing to be sustained. Also, at least one of the reflectors does not reflect light at the pump wavelength, thereby allowing the pump light to enter the cavity through one of the end reflectors.

It is also known that such reflectors may be Bragg gratings which are impressed directly into the optical fiber, as discussed in U.S. Pat. Nos. 4,807,950 and 4,725,110 entitled "Method for Impressing Gratings within Fiber Optics", both to Glenn et al.

Such a laser can be designed and fabricated so as to achieve single longitudinal mode lasing performance with narrow linewidth and continuous tunability over a predetermined wavelength range, as is discussed in U.S. Pat. Nos. 5,305,335, entitled "Single Longitudinal Mode Pumped Optical Waveguide Laser Arrangement", to Ball et al, and U.S. Pat. No. 5,317,576, entitled "Continuously Tunable Single-Mode Rare-Earth Doped Pumped Laser Arrangement", to Ball et al.

Such fiber laser sources offer the possibility of improved performance characteristics such as higher power and narrower linewidth when compared to semiconductor laser sources and diode pumped solid state laser sources commonly used in fiber optic systems.

However, it is also known that the intensity of the output light from a fiber laser may exhibit variations with time (or noise). This noise is called relative intensity noise (RIN) and is typically measured in dB/Hz with respect to the continuous wave (cw) lasing level and has a magnitude profile which varies with frequency, as is known. For example, for a prior art Erbium-doped fiber laser, the RIN may be $-110$ dB at low frequencies (e.g., less than 100 KHz) and $-140$ dB at high frequencies (e.g., greater than 100 MHz).

While this level of noise may be acceptable for digital systems, it is not acceptable for analog applications such as cable television, which require a noise level of about $-160$ dB/Hz at high frequencies.

Also, there exists a localized resonant peak (or noise spike) in the RIN profile at low frequencies (e.g., approximately 250 KHz, depending on the laser power) which is related to relaxation oscillations in the laser cavity. This peak has a magnitude of about $-80$ dB/Hz in some prior art systems. It is desirable for digital and analog transmission systems to reduce the RIN noise spike as much as possible, e.g., to less than $-120$ dB/Hz.

One way to decrease RIN is to increase the laser output power. One technique known in the art for increasing laser power is to increase the cavity doping concentration. However, such increased concentration often leads to clustering effects in the Er which reduces laser efficiency and causes self-spiking.

Another way to increase power is to use a more efficient gain medium, e.g., a co-doped Erbium-Ytterbium fiber as described in the article: Kringlebotn et al, "Efficient Diode-Pumped Single-Frequency Erbium:Ytterbium Fiber Laser", IEEE Photonics Techn. Lett., Vol. 5, No. 10, pp 1162–1164 (October 1993); and J. Kringlebotn et al, "Highly-efficient, Low-noise Grating-feedback Er3+:Yb3+Codoped Fibre Laser", Electr. Lettr., Vol. 30, No. 12, pp 972–973 (June 1994). Even though such increased power reduces the overall RIN at all frequencies, such technique does not eliminate the low frequency RIN peak. Also, as laser power increases, the frequency where the RIN noise spike occurs increases as well.

Thus, it would be desirable to provide a fiber laser which has reduced RIN profile at both low and high frequencies.

DISCLOSURE OF INVENTION

Objects of the invention include provision of a fiber laser which has a reduced RIN magnitude profile at both low and high frequencies.

According to the present invention a polarization controlled waveguide laser, comprises a solid optical waveguide which propagates laser light; a pair of reflective elements disposed a predetermined distance apart along the waveguide, each reflecting the laser light; a gain portion of the waveguide between the reflective elements being doped with a first rare-earth dopant and a second rare-earth dopant; one of the reflective elements passing a predetermined amount of the laser light as a laser output light; first pump means, for providing a first pump signal at a first pump wavelength, the first pump signal being incident on the gain portion of the waveguide; second pump means, responsive to a pump control signal, for providing a second pump signal at a second pump wavelength, the second pump signal being incident on the gain portion of the waveguide; control means, for providing the pump control signal to the second pump means and for adjusting the pump control signal in response to the output light, so as to reduce relative intensity noise of the output light; the first dopant absorbing the first pump wavelength and energy from the first dopant transitioning from the first dopant to the second dopant, and the second dopant emitting the laser light; the second dopant absorbing the second pump wavelength and having a pump-to-lasing transition time which is faster than a pump-to-lasing transition time of the first dopant; and the transition time of the first dopant being fast enough to allow the control means to reduce the relative intensity noise of the output light over a predetermined frequency range.

The invention represents a significant improvement over the prior art by providing a low RIN fiber laser, e.g., $-160$ dB/Hz, at high frequencies while also reducing the relaxation oscillation RIN peak at low frequencies, e.g., to −120 dB/Hz. The invention utilizes a co-doped fiber laser cavity, e.g., $Er^{+3}:Yb^{+3}$ (Erbium: Ytterbium) and dual-wavelength pumping. A first pump wavelength $\lambda_{P1}$ efficiently pumps the Yb to the excited state and the Yb energy is transitioned to the Er atoms which ultimately lase at the desire lasing frequency. Because Yb is pumped efficiently, high pump absorption is achieved, thereby providing high laser output power and, consequently, reduced RIN. Simultaneously, a second pump wavelength directly $\lambda_{P2}$ (different from $\lambda_{P1}$) pumps the Erbium (Er) at a wavelength close to the lasing transition and thus populate the lasing transition quickly. This allows sufficient bandwidth to provide closed loop control on the lasing intensity at the lasing wavelength which drives the second pump signal to control low frequency RIN spiking caused by relaxation oscillations in the laser. Alternatively, a control loop may additionally be closed using the $\lambda_{P1}$ pump to control very low frequency (DC to 1 KHz) RIN.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
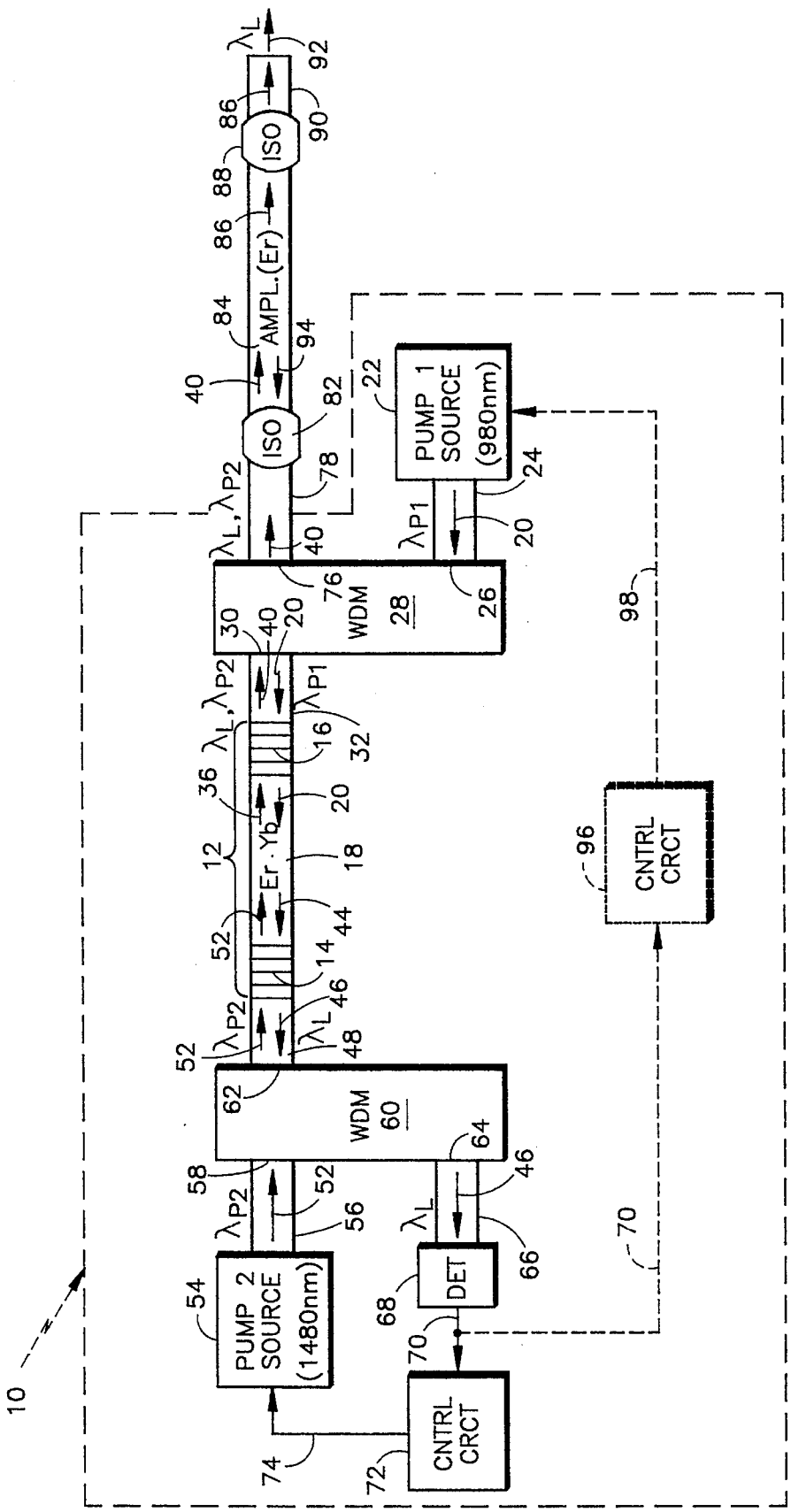
FIG. 1 is a schematic block diagram of a dual-wavelength pumped low noise fiber laser, in accordance with the present invention.

Referring to FIG. 1, a dual-wavelength pumped low noise fiber laser 10 includes a fiber laser 12 having Bragg gratings 14,16 embedded in the core of the fiber a predetermined distance apart. Between the gratings 14,16 is a region of fiber 18 of which all or a portion thereof is doped with two predetermined rare-earth dopants (or gain or active medium), e.g., Erbium ($Er^{+3}$) and Ytterbium ($Yb^{+3}$), which acts as a laser cavity 18. The Er:Yb doping may be similar to that discussed in the article: Kringlebotn et al, "Efficient Diode-Pumped Single-Frequency Erbium:Ytterbium Fiber Laser", IEEE Photonics Techn. Lett., Vol. 5, No. 10, pp 1162–1164 (October 1993).

A Bragg grating, as is known, is a periodic variation in refractive index of the fiber core which has a reflectivity profile which reflects a predetermined narrow wavelength band of light and passes all other wavelengths. The gratings 14,16 have a grating spacing so as to provide a peak reflectivity at a lasing wavelength $\lambda_L$ (e.g., about 1550 nanometers, for an erbium-doped cavity) of the fiber laser. The gratings 14,16 may be formed by any convenient technique known in the art, such as impressing them into the optical fiber as discussed in U.S. Pat. Nos. 4,807,950 and 4,725,110 entitled "Method for Impressing Gratings within Fiber Optics", both to Glenn et al. Any other technique for impressing the gratings 14,16 into the fiber may be used if desired. The gratings 14,16 may be spliced onto opposite ends of the laser cavity 18 if desired, or the section of fiber where the gratings 14,16 are located may be doped if desired.

The gratings 14,16 and the doped fiber cavity 18 (or fiber cavity with a gain medium therein) make up the three fundamental elements of a typical fiber laser, such as is described in U.S. Pat. No. 5,305,335, entitled "Single Longitudinal Mode Pumped Optical Waveguide Laser Arrangement", to Ball et al, and U.S. Pat. No. 5,317,576, entitled "Continuously Tunable Single-Mode Rare-Earth Doped Pumped Laser Arrangement", to Ball et al., as well as U.S. Pat. No. 5,237,576 entitled "Article Comprising an Optical Fiber Laser" to DiGiovanni, all of which are incorporated herein by reference.

More specifically, the fiber laser 12 is pumped by a first input pump light 20 from a first pump light source 22, e.g., a laser diode. The pump light 20 has a first pumping wavelength $\lambda_{P1}$, e.g., 980 nanometers. The pump light 20 travels along a fiber 24 to a port 26 of a known wavelength division multiplexer (WDM) 28 which provides wavelength sensitive coupling of light. The light 20 is coupled to a port 30 of the WDM 28 and propagates along an optical fiber 32 to the fiber laser 12.

The pump light 20 passes through the grating 16 (because the pump wavelength $\lambda_{P1}$ is not in the reflection wavelength band of the grating 16) and enters the laser cavity 12. The pump wavelength $\lambda_{P1}$ primarily excites the Ytterbium (Yb) portion of the gain medium of the cavity 18 to a predetermined energy level. The energy of the excited Yb atoms transitions to the Erbium (Er) atoms and the Er emits photons at the lasing wavelength $\lambda_L$, as indicated by a line 36 (discussed more hereinafter).

The gratings 14,16 for a fiber laser, as discussed hereinbefore, are designed to have a narrow reflection wavelength at the lasing wavelength $\lambda_L$. Typically, the front grating 14 reflects 99.5% of light at the lasing wavelength $\lambda_L$ and the back grating 16, from which output laser light 40 exits, typically reflects 70% of the cavity light 36 at the lasing wavelength $\lambda_L$. Other percent reflectivities may be used if desired. The light 36 at the lasing wavelength $\lambda_L$ that passes through the back grating 16 exits the laser as output laser light 40 along the fiber 32.

Also, a predetermined amount of the cavity light 36 reflects off the grating 16, as indicated by a line 44. The light 44 is incident on the grating 14 which reflects the aforementioned predetermined amount of light at the lasing wavelength and passes a portion of the light 46 out of the cavity 18 at the lasing wavelength along a fiber 48.

As is known, for lasing to be sustained, the lasing condition (or lasing threshold) must be met (i.e., the round trip small signal gain times the round trip loss for light within the cavity is greater than or equal to one). This is accomplished by setting the amount of cavity gain, the length of the cavity, and the reflectivity of the gratings so as to meet this condition. It should be understood that the length of the cavity is not critical to the present invention, i.e., the invention will work on any length cavity. However, for single longitudinal mode operation, the laser cavity should be as short as possible.

The laser 12 is also pumped by a second optical signal 52 from an optical pump source 54, e.g., a laser diode, having a second pump wavelength $\lambda_{P2}$, e.g., 1480 nm. The source 54 provides the second pump signal 52 along a fiber 56 to a port 58 of a WDM 60, similar to the WDM 28. The WDM 60 couples the light 52 to a port 62 of the WDM which is coupled to the fiber 48. The pump light 52 passes through the grating 14 and enters the cavity 18. The pump light 52 excites the Er portion of the Er:Yb gain medium and allows the Er to emit lasing light at the lasing wavelength $\lambda_L$ (e.g., 1550 nm). As discussed hereinbefore, light within the cavity at $\lambda_L$ resonates in the cavity between the reflectors 14,16 and a portion is allowed to pass as output light signals 46,40, respectively, from the laser.

The light 46 enters the port 62 of the WDM 60 which couples the light 46 at the lasing wavelength $\lambda_L$ to a port 64 of the WDM 60. The light 46 travels along an optical fiber 66 and is fed to an optical detector 68 which detects the signal 46 and provides an electrical signal on a line 70 indicative thereof. The line 70 is fed to a control circuit 72 which provides an electrical signal on a line 74 to the pump source 54. The control circuit 72 contains known electronic control components (e.g., op-amps, etc.) designed to provide PID closed loop control of the intensity of the output light from the laser to reduce low frequency (about 250 KHz) RIN of the laser, similar to the circuit described in the article: Ball, et al, "Low Noise Single Frequency Linear Fibre Laser", Elect. Lett. Vol. 29, No. 18, pp 1623–1625 (September 1993). Alternatively, the control circuit 72 may comprise a known computer with comparable known control software.

The light 40 that exits the laser 12 comprises light at the lasing wavelength $\lambda_L$ as well as light at the pump wavelength $\lambda_{P2}$ that was not absorbed by the gain medium in the fiber laser 12. The light 40 is fed to the port 30 of the WDM 28 along the fiber 32. The WDM 28 couples the light 40 to a port 76 of the WDM 28 and exits the WDM on a fiber 78, and is the output light from the dual-wavelength pumped fiber laser 10.

The light 40 from the WDM 28 passes through an optical isolator 82, which passes light in only one direction, and is incident on a fiber optic amplifier 84. The amplifier 84 comprises an optical fiber which is doped with a rare-earth dopant (or gain medium), e.g., erbium, and provides an output light 86 which is amplified at the lasing wavelength $\lambda_L$ from that of the input signal 40. The light 86 passes though an output isolator 88, which passes light in only one direction, and then travels along a fiber 90 and ultimately exits the fiber 90 as indicated by a line 92. The amplifier 84 uses the remaining pump energy at the second pump wavelength $\lambda_{P2}$ (that was not absorbed by the gain medium of the fiber laser 12) to excite the amplifier gain medium to a level that allows the stimulated emission of photons at the lasing wavelength $\lambda_L$ by the amplifier 84.

The isolator 82 prevents light 94 emitted by the amplifier 84, toward the WDM 28, from entering and disrupting the operation of the fiber laser 12. The isolator 88 prevents external optical signals from entering and disrupting the operation of the amplifier 84.

The general fiber laser and amplifier arrangement is similar to a Master Oscillator Power Amplifier (MOPA) arrangement described in copending U.S. patent application Ser. No. 08/013,490, "Embedded Bragg Gating Pumped Optical Waveguide Laser Source/Power Amplifier Arrangement", to Ball et al. However, the invention need not be utilized with the fiber amplifier 84 and/or the isolators 82,88.

Figure 2:
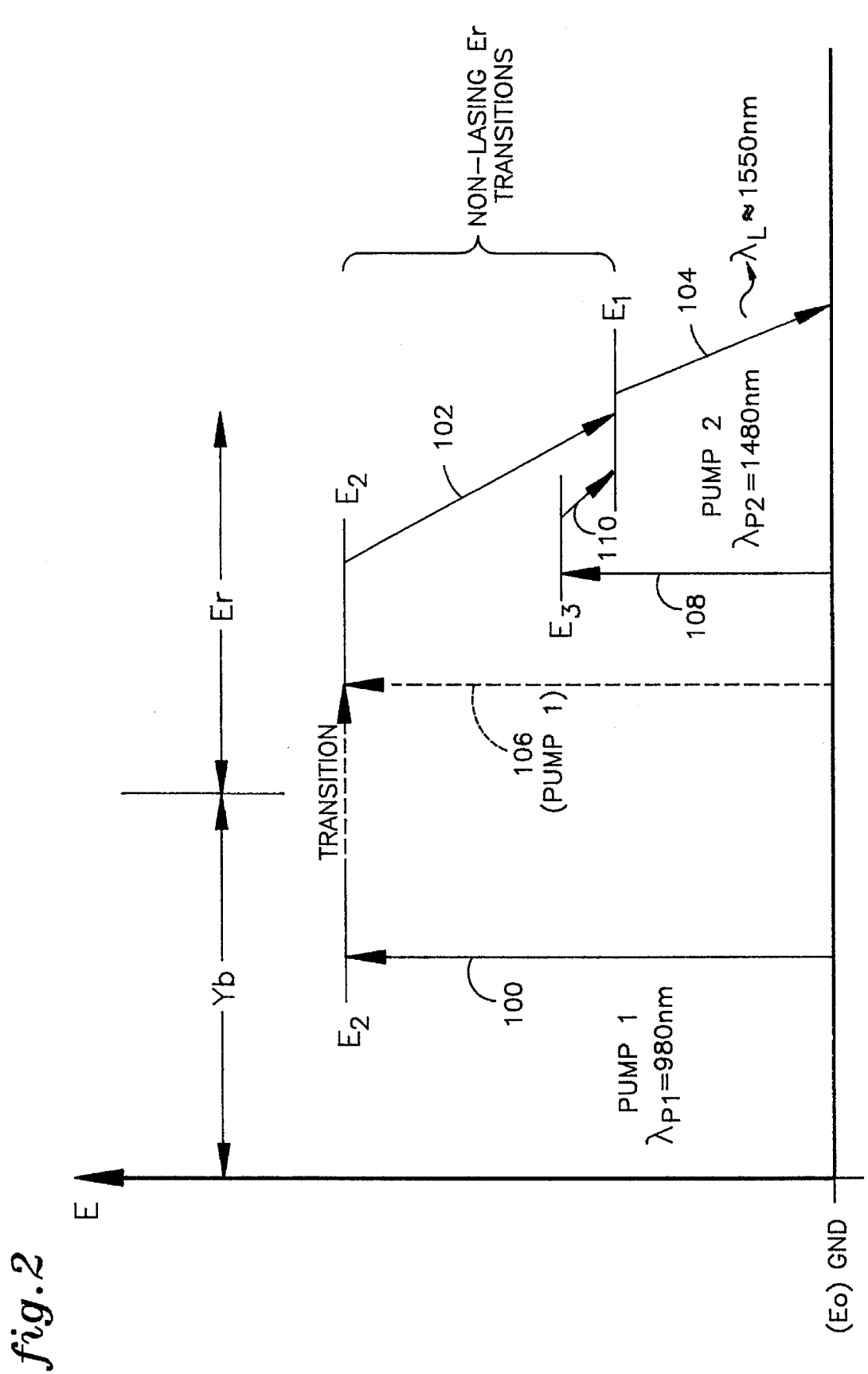
FIG. 2 is an energy diagram of an $Er^{+3}:Yb^{+3}$ cavity of the dual-wavelength pumped fiber laser, in accordance with the present invention.

Referring now to FIG. 2, the first pump wavelength $\lambda_{P1}$ pumps primarily the Yb atoms to an energy level $E_2$ in a pumping transition indicated by a line 100. The Yb energy $E_2$ transitions to Er atoms by phonon transition at a similar Er energy level. The energy of the Er atoms decay from the $E_2$ level to an $E_1$ energy level in a non-lasing (or non-radiative) transition as indicated by a line 102. From the $E_1$ level a lasing transition to ground energy level $E_0$ occurs, as indicated by a line 104, and photons at the lasing wavelength $\lambda_L$ are emitted. The Yb portion of the gain medium exhibits highly efficient energy absorption of the 980 nm pump light. Thus, most of the pump energy at the first pump wavelength $\lambda_{P1}$ is absorbed by the Yb laser gain medium and high laser output power, e.g., 20 milliWatts, is achievable. Because the first pump wavelength $\lambda_{P1}$ (980 nm) is within the absorption wavelength band of Er, the Er will absorb some small amount of the pump power at $\lambda_{P1}$, as indicated by a dashed line 106. However, because the Yb absorption at 980 nm is much greater than that for Er at 980 nm, almost all of the pump power will be absorbed by the Yb and then transitioned to the Er.

Simultaneous to pumping the laser 12 with the first pumping wavelength $\lambda_{P1}$, the laser is also pumped with the second pump wavelength $\lambda_{P2}$ (e.g., 1480 nm). The second pumping wavelength $\lambda_{P2}$ pumps the Er to an energy $E_3$, as indicated by a line 108. However, Yb is not pumped by $\lambda_{P2}$ because it is outside the absorption wavelength band for Yb. The Er atoms decay to the $E_1$ energy level in a small non-lasing transition 110. Then, the lasing transition 104 occurs from $E_1$ to ground $E_0$, and photons at the lasing wavelength $\lambda_L$ are emitted.

Because the difference between the energy levels $E_3$ and $E_1$ is small and the levels $E_3$ and $E_1$ are part of a common energy manifold, the transition from the energy $E_3$ to the energy $E_1$ is a rapid decay, and the time constant (or lifetime) of the $E_3$ excited state is short. Thus, the 1480 nm Er pumping-to-lasing energy cycle transitions 108,110 have a relatively high bandwidth. In contrast, the pumping-to-lasing cycle transitions 100,102 for the 980 nm Yb are much slower for similar reasons. Consequently, the 1480 nm pump may be used in a closed loop configuration to adjust the population of excited atoms at the $E_1$ energy level (i.e., adjust the population inversion in the lasing transition 104) and thus to reduce RIN in the laser at much higher frequencies than if the loop were closed around the Yb 980 nm pump wavelength $\lambda_{P1}$.

Figure 3:
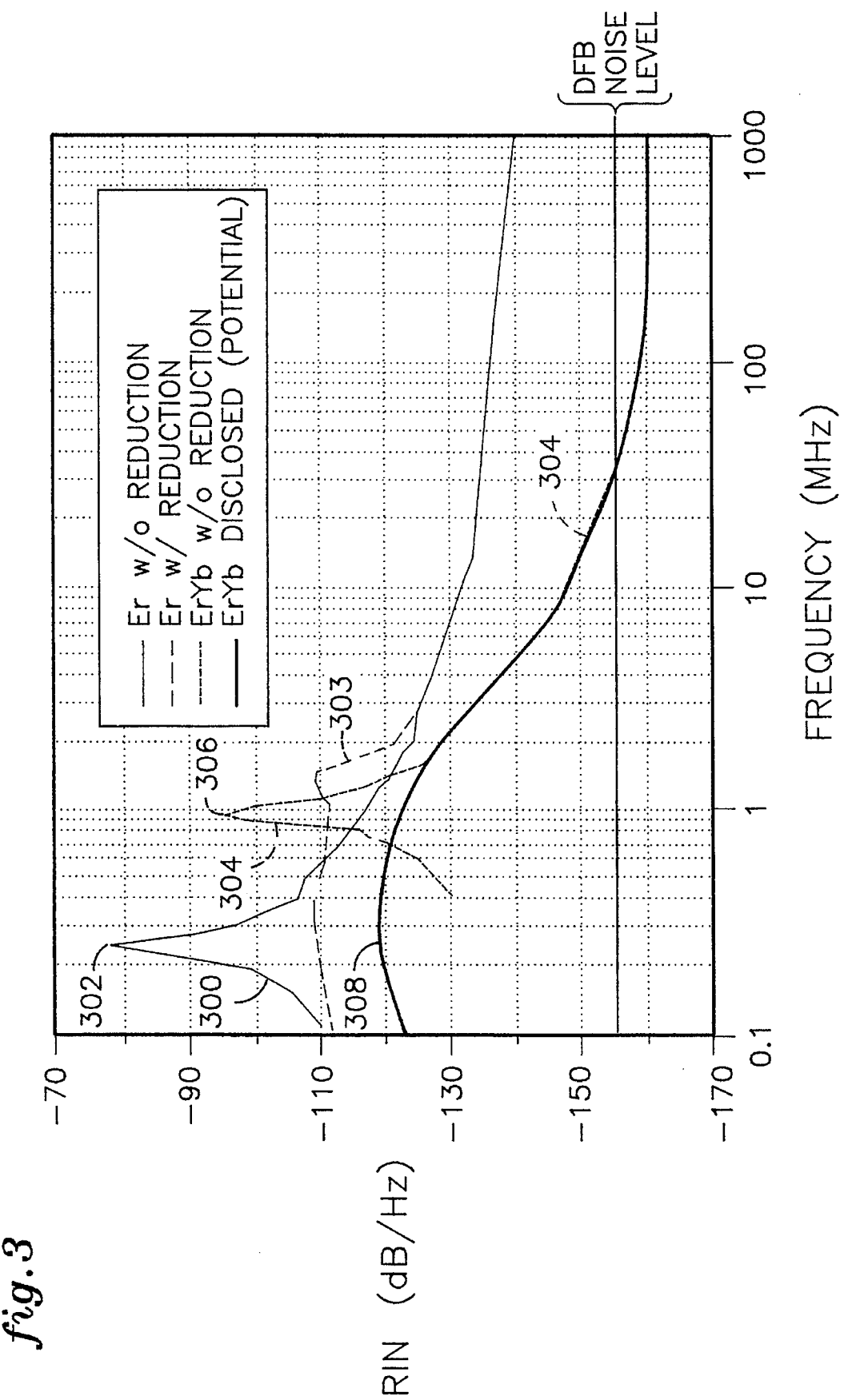
FIG. 3 is a graph of relative intensity noise (RIN) with the prior art and in accordance with the present invention.

Referring now to FIG. 3, a frequency characteristic plot of the RIN of various fiber laser configurations is shown. A curve 200 shows the RIN for a prior art Erbium-doped fiber laser having a noise spike (due to relaxation oscillation) at about 250 KHz and having a magnitude peak RIN at a point 202 of about −80 dB/Hz. The high frequency (greater than 1000 MHz) RIN is about −140 dB. If RIN reduction closed loop feedback control on the pump is used, the noise spike is suppressed as indicated by a curve 203. In an Er:Yb doped fiber laser, the output power is greatly increased and, as a result, the entire RIN curve is decreased, as indicated by a short-dashed curve 204. However, a noise spike 206 still exists with the Er:Yb but has shifted to a higher frequency, e.g., about 1 Mhz. However, when the loop is closed by controlling the faster pump 1480 nm wavelength in the present invention, the noise spike 206 is substantially eliminated while maintaining a low RIN value (−160 dB/Hz) at high frequencies.

In particular, the control circuit 72 (FIG. 1) provides closed loop RIN reduction control on the 1480 nm pump. Because the time constant for the 1480 nm pump-to-lasing cycle is faster than that for the 980 nm Yb pump-to-lasing cycle, as discussed hereinbefore, the control circuit 72 can have a closed loop bandwidth fast enough so as to substantially eliminate the RIN peak 206 at about 1 MHz. RIN peaks at higher than 1 MHz may be suppressed if desired provided the bandwidth of the controller 72 and the pump-to-lasing time is fast enough to support such control.

The 1480 nm pump has sufficient authority to reduce the RIN by at least 20 dB/Hz. Because the 1480 nm wavelength is not absorbed by the Yb, the 1480 nm pump power is directly absorbed by the Er thereby maximizing the control authority of the 1480 nm pump.

In an alternative embodiment, the line 70 may also be fed to an additional control circuit 96 which provides a control signal on a line 98 to control the 980 nm Yb pump source 22, so as to provide low frequency RIN control of the output laser light 40. The control circuit 96 is a standard PID controller similar to the control circuit 72, which has a low bandwidth and can be used to stabilize the output intensity at very low frequencies, e.g., DC to 1 KHz. Other control frequency ranges may used be if desired, provided the control circuit 96 and the pump-to-lasing transition is fast enough to provide such closed loop control. Alternatively, the control circuits 96,72 may be combined into a single control circuit (not shown), or computer with a control software program (not shown), having one input signal on the line 70 and two output control signals on the lines 74,98.

Instead of injecting the two pump signals 20,52 from opposite ends of the fiber laser 12 as shown in FIG. 1, the signals 20,52 may be injected at one end of the fiber laser. One such embodiment is shown in FIG. 4.

Figure 4:
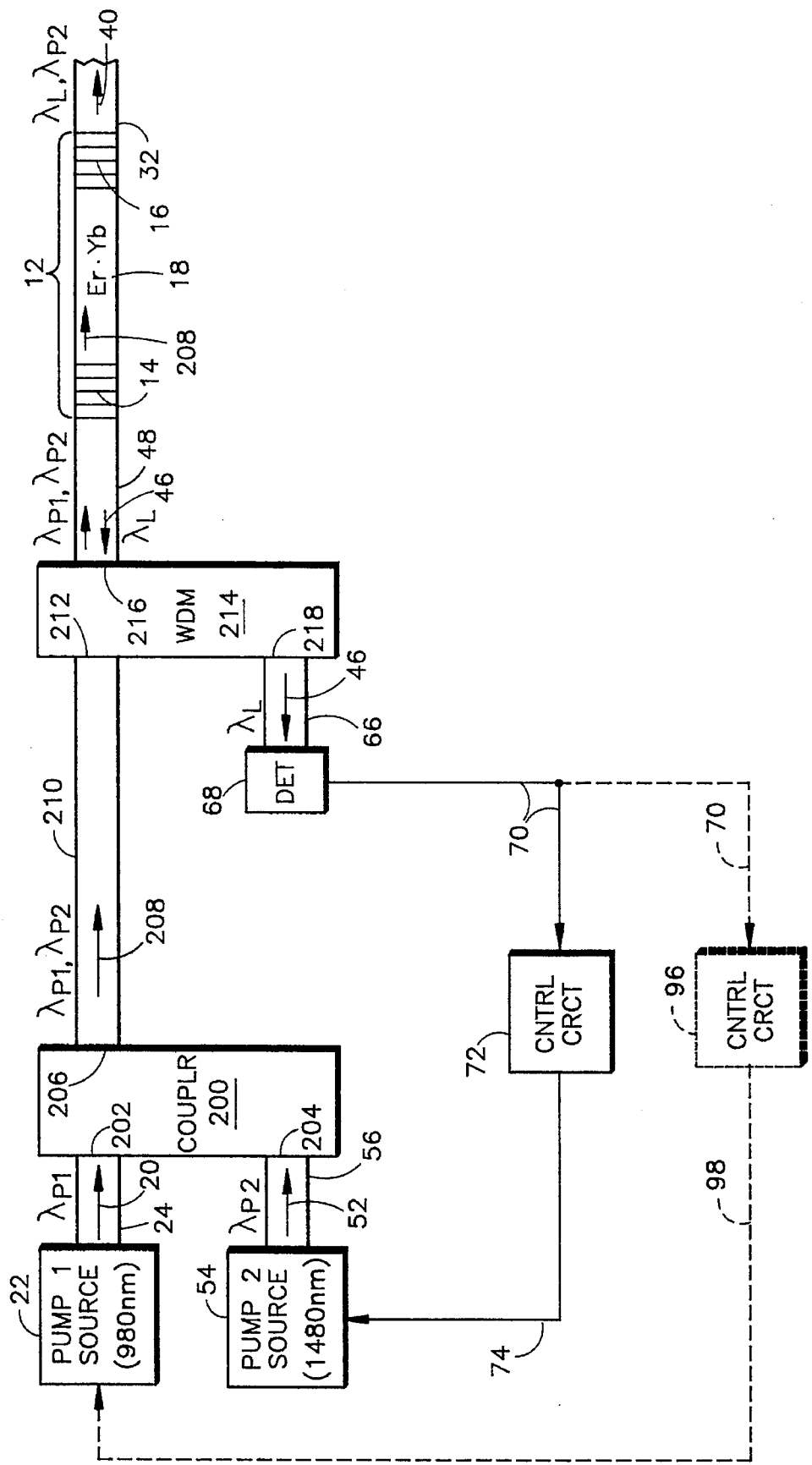
FIG. 4 is a schematic block diagram of a dual-wavelength pumped low-noise fiber laser with both pump wavelengths being incident on the laser from one end of the laser, in accordance with the present invention.

Referring now to FIG. 4, the first pump signal 20 from the pump source 22 is fed to a port 202 of an optical coupler 200. Also, the second pump signal 52 on the fiber 56 from the pump source 54 is fed to a port 204 of the coupler 200. The coupler 200 couples the input signals 20,52 to an output port 206 as a combined optical signal 208 having both pump wavelengths $\lambda_{P1}$ and $\lambda_{P2}$. The light 208 travels along a fiber 210 and is fed to a port 212 of a wavelength division multiplexer 214 similar to the WDM 60 discussed hereinbefore with FIG. 1. The WDM couples the light 208 to a port 216 of the WDM 214. The light 208 propagates along the fiber 48 to the fiber laser 12 and passes through the grating 14 into the laser cavity 18 whereupon both wavelengths $\lambda_{P1}$ and $\lambda_{P2}$ pump the Er:Yb laser gain medium in a similar manner to that discussed hereinbefore with FIG. 1. As also discussed hereinbefore, the fiber laser 12 provides laser output light signals 40,46 from opposite ends of the laser 12 at the lasing wavelength $\lambda_L$ along the fibers 32,48, respectively. The output light 40 may then be coupled to the amplifier 84 and isolators 82,88 as shown in FIG. 1 or alternatively may be used as an output without amplification.

The output laser light 46 travels along the fiber 48 and re-enters the WDM 214 at the port 216. The WDM 214 couples the light 46 to a port 218 where the light 46 travels along the fiber 66 to the optical detector 68 (discussed hereinbefore). The detector 68 provides an electrical signal on the line 70 indicative of the light 46 and is fed to the control circuit 72 discussed hereinbefore. The control circuit 72 provides the control signal on the line 74 to the pump source 52 as discussed hereinbefore with FIG. 1. Optionally, the line 70 may also be fed to the additional control circuit 96 which provides the control signal on the line 98 to control the 980 nm Yb pump source 22, so as to provide low frequency e.g., less than 1 KHz, RIN control of the output laser light 40, as discussed hereinbefore with FIG. 1.

Any other technique for optically pumping a fiber laser with two (or more) wavelengths may be used if desired. For example, pump light may be coupled into the side of the laser cavity instead of the ends.

Although the invention has been described as using a Bragg grating at either end of the laser cavity 18, the RIN reduction concept of the present invention applies equally well to fiber laser cavities which use more conventional mirrors, such as dielectrics or other reflecting surfaces, for optical cavity feedback. Also, it should be understood that the invention will work equally well with any solid optical waveguide, e.g., a planar, rib, or channel waveguide, instead of an optical fiber.

Also, even though the invention has been described as using Erbium and Ytterbium as the two co-dopants for the laser cavity 18, it should be understood that any two (or more) dopants may be used provided a first dopant efficiently absorbs one pump wavelength and transitions its energy to a second dopant, and the second dopant efficiently absorbs a second pump wavelength and has a pump-to-lasing transition time which is faster than that for the first dopant, thereby allowing closed loop control of laser intensity on the second pump to reduce RIN spikes.

Further, the invention may be used with a codoped distributed feedback laser arrangement similar to that described in the articles: J. Kringlebotn et al, "Er+3:Yb+3 -Codoped Fiber Distributed-Feedback Laser", Optics Letters, Vol. 19, No. 24, pp 2101–2103 (December 1994); and H. Kogelnik et al, "Coupled-Wave Theory of Distributed Feedback Lasers", J. Appl. Phys., Vol. 43, No. 5, pp 2327–2335 (May 1972). In that case, the gratings 14,16 of the fiber laser 12 extend from opposite ends of the fiber toward the middle thereof, but end a predetermined distance from each other, e.g., one quarter of a lasing wavelength, so as to support single longitudinal mode lasing. Alternatively, the gratings 14,16 may be replaced with one continuous grating without the quarter wavelength gap. This typically results in multiple longitudinal mode lasing.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A polarization controlled waveguide laser, comprising:

a solid optical waveguide which propagates laser light;

a pair of reflective elements disposed a predetermined distance apart along said waveguide, each reflecting said laser light;

a gain portion of said waveguide between said reflective elements being doped with a first rare-earth dopant and a second rare-earth dopant;

one of said reflective elements passing a predetermined amount of said laser light as a laser output light;

first pump means, for providing a first pump signal at a first pump wavelength, said first pump signal being incident on said gain portion of said waveguide;

second pump means, responsive to a pump control signal, for providing a second pump signal at a second pump wavelength, said second pump signal being incident on said gain portion of said waveguide;

control means, for providing said pump control signal to said second pump means and for adjusting said pump control signal in response to said output light, so as to reduce relative intensity noise of said output light;

said first dopant absorbing said first pump wavelength and energy from said first dopant transitioning from said first dopant to said second dopant, and said second dopant emitting said laser light;

said second dopant absorbing said second pump wavelength and having a pump-to-lasing transition time which is faster than a pump-to-lasing transition time of said first dopant; and said transition time of said first dopant being fast enough to allow said control means to reduce said relative intensity noise of said output light over a predetermined frequency range.

2. The laser of claim 1 wherein at least one of said reflective elements comprises a Bragg grating.

3. The laser of claim 1 wherein said first rare-earth dopant comprises ytterbium.

4. The laser of claim 1 wherein said second rare-earth dopant comprises erbium.

5. The laser of claim 1 wherein only a single longitudinal mode lases in the laser.

6. The laser of claim 1 wherein said frequency range is less than about 1 MHz.

7. The laser of claim 1 wherein said reflective elements comprise a distributed feedback arrangement.

8. The laser of claim 1 wherein the laser is optically coupled to an optical amplifier.

9. The laser of claim 1 wherein said control means comprises means for providing a second pump control signal to said first pump means and for adjusting said second pump control signal in response to said output light, so as to reduce relative intensity noise of said output light at low frequencies.

10. The laser of claim 9 wherein said-control means reduces relative intensity noise of said output light at frequencies in the range from dc to 1 KHz.

* * * * *